C. H. OSLUND.
STOP MECHANISM FOR BRAIDING MACHINES.
APPLICATION FILED MAR. 17, 1921.
1,434,450.
Patented Nov. 7, 1922.
2 SHEETS—SHEET 1.
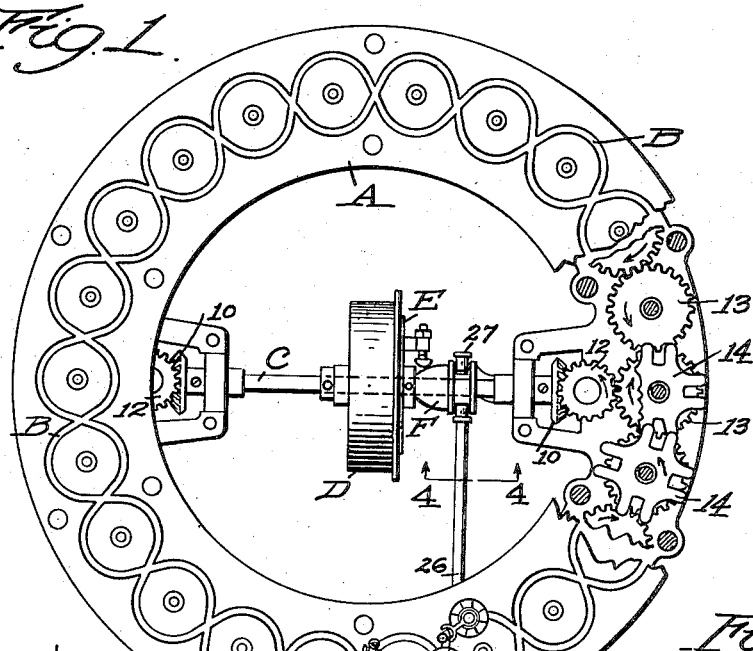
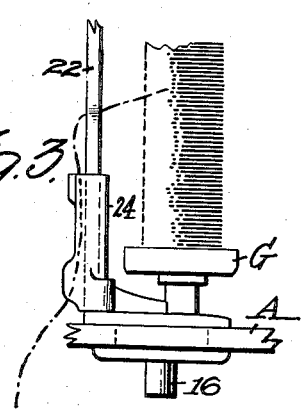
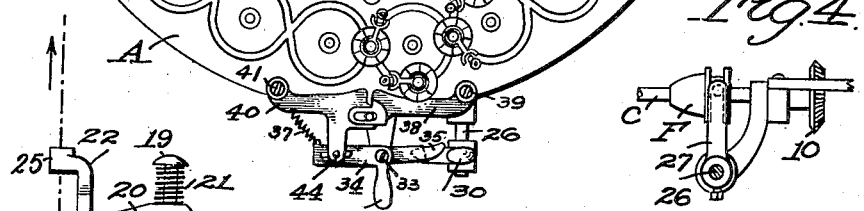
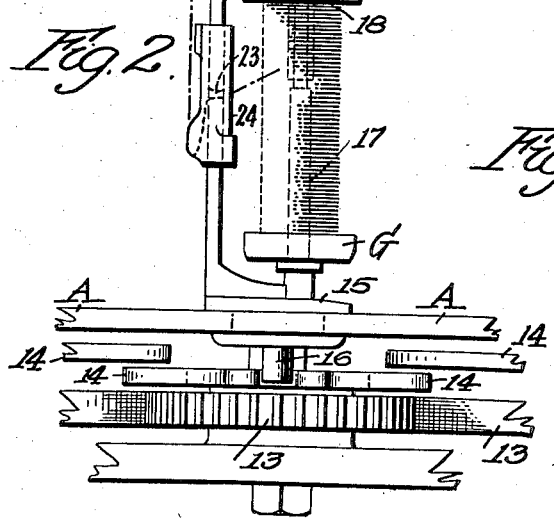
Inventor
Charles H. Oslund.
by attorneys

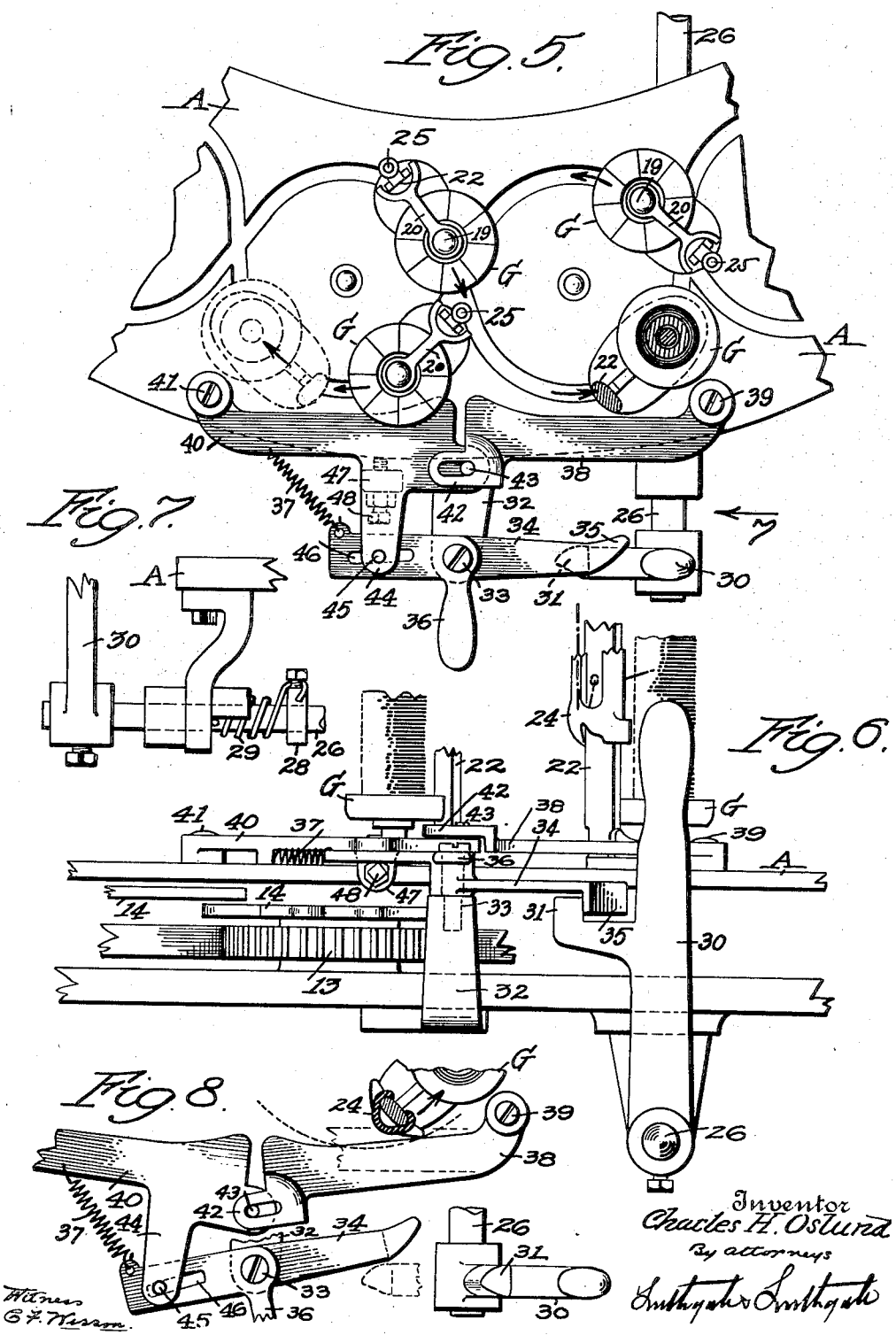

Patented Nov. 7, 1922.

1,434,450

UNITED STATES PATENT OFFICE.

CHARLES H. OSLUND, OF WORCESTER, MASSACHUSETTS, ASSIGNOR TO THE O. & J. MACHINE COMPANY, OF WORCESTER, MASSACHUSETTS, A CORPORATION OF MASSACHUSETTS.

STOP MECHANISM FOR BRAIDING MACHINES.

Application filed March 17, 1921. Serial No. 453,055.

*To all whom it may concern:*

Be it known that I, CHARLES H. OSLUND, a citizen of the United States, residing at Worcester, in the county of Worcester and State of Massachusetts, have invented a new and useful Stop Mechanism for Braiding Machines, of which the following is a specification.

The object of this invention is to provide a new and improved stop mechanism for braiding machines which will throw the machine out of operation upon the breakage or expansion of a thread and which will permit the machine to be run at high speed.

To this end, the invention consists of the mechanism described and claimed in this specification and illustrated in the accompanying two sheets of drawings in which Fig. 1 is a plan view of a braiding machine showing how my stop mechanism is applied thereto;

Fig. 2 is a side elevation of a spool and the carrier mechanism therefor;

Fig. 3 is a partial view similar to Fig. 2 illustrating the position the spool-drop assumes upon the breakage of the thread;

Fig. 4 is a partial sectional view illustrating the right hand end of the driving shaft;

Fig. 5 is a plan view of the stop mechanism on an enlarged scale;

Fig. 6 is a front elevation thereof;

Fig. 7 is a side elevation of the front end of the shaft controlling the clutch; and Fig. 8 is a plan view illustrating the operation of the stop mechanism.

Referring to the drawings and in detail, A designates the base or table of the machine which has the usual circular series of interconnected circular guiding grooves B. C designates the driving shaft, running loosely on which is a driving pulley D, engaging which is a friction E tight on the shaft A. This friction can be thrown into engagement by a cone F fitted to slide axially on the shaft C and engaging an adjustable bolt on the friction E. The parts D, E and F represent a friction clutch of any improved construction.

The shaft C is provided at each end with a mitre gear 10 which meshes with a compound mitre gear and pinion 12 which meshes with one of a series of intermeshing gears 13 arranged in a circle around the base A. Each gear 13 carries and drives a notched cross-shaped piece 14. These crosses are arranged alternately in two different horizontal planes. A spool carrier, 15 has flanges fitting above and below the table as shown and has a depending stud 16, which is engaged by the ends of the crosses. The carrier 15 is provided with a spindle 17 on which the spool or bobbin G is slipped. The top of the spool is made in the form of a ratchet wheel. Fitting on top of the spindle is a tube 18. A stud 19 is secured in the top of the tube and loosely pivoted on the same is a pawl arm 20 which is kept downwardly in place by a spring 21 arranged on the stud and which engages the ratchet wheel on the top of the spool. Extending upwardly from the carrier 15 is a thread guide support 22, the ends of the pawl 20 being made to fit on the same. Sliding on the support is the spool-drop 24. The thread from the spool is led through a hole 23 in the support 22, a slot being cut into the hole so that the thread can be inserted therein, and then down around the spool-drop 24 and then up through the thread guide or eye 25 formed at the top of the support 22. These parts 10 to 25 inclusive are arranged as is usual in braiding machines so that there will be two series of spools, one running around the grooves B in a clockwise direction, and the other running around the grooves B in an opposite direction, the spools weaving in and out as they travel around the table to make the braid. As the threads are taken up by the braiding operation each spool-drop is lifted and raises its pawl arm and allows its thread to unwind from the spool.

It is desirable to run these braiding machines at a high speed and to stop the same when any thread breaks or becomes exhausted. If a thread should break it is obvious that the spool-drop 24, through which the same passes, will drop to its lowest position as shown in Fig. 3. My improved stop mechanism is arranged so as to be operated by any spool-drop when in its lowest position.

This stop mechanism is arranged as follows: A shaft 26, journalled in suitable brackets, is provided with a yoke 27 to engage the cone F of the friction clutch as illustrated in Fig. 4. A collar 28 is arranged on this shaft and a spring 29 is arranged between this collar and one of the brackets in which the shaft 26 is journalled as shown in Fig. 7. This spring is arranged so as normally to throw the cone F to the right in Fig. 4 so as to disengage the friction clutch. A handle 30 is secured on the front end of the shaft 26 and the same is provided with a catch 31. A bracket 32 is carried out from the front of the machine and a stud 33 is secured therein pivoted on which stud is a lever 34 having a hook 35 arranged in position to co-operate with the catch 31 on the handle 30. The lever 34 is provided with a handle 36 and a spring 37 is secured to the end thereof and to the framework of the machine so as normally to cause the hook 35 to engage with the catch 31. A shoe 38 is pivoted on a stud 39 secured to the table and another shoe 40 is pivoted on a stud 41 secured in the table. The shoes 38 and 40 are made rights and lefts as shown. The shoe 38 has a slotted arm 42 which extends over the shoe 40 and a pin 43 is secured to the shoe 40 and extends up through the slot in the arm 42, whereby the shoes will be interconnected. The shoe 40 has an extending arm 44 which is provided with a pin 45 which fits in a slot 46 cut in the left hand end of the lever 34. The shoe 40 is also provided with a depending boss 47 threaded in which is a bolt 48 carrying a check nut and engaging the framework of the machine so that the operative position of the parts can be adjusted.

The operation is as follows:

When it is desired to set the machine in operation, the handle 30 is moved to the left as shown in Fig. 6 which will throw the friction clutch into engagement, and the handle 36 will move to the left to cause the hook 35 to engage the catch 31 and hold the friction clutch in engagement. The machine will now operate so long as the threads remain intact. By throwing the handle 36 to the right the clutch can be released. Now suppose that one of the threads on one of the spools moving in a contra-clockwise direction should break or become exhausted, then the spool carrier of this particular spool will drop and as the same passes by the right hand shoe 38 the same will engage therewith as shown in Figs. 5 and 8 and will throw the shoe outwardly thus moving the lever 34 so that the hook 35 thereof will disengage from the catch 31 which will allow the spring 29 to throw the cone F to release the friction clutch and stop the machine. It will be seen that this engagement of the spool-drop with the right hand shoe is an easy, nice, wiping or sliding action so that the spool-drop can pass by the shoe after it operates the same. This will allow the machine to be worked at high speed because after the stop mechanism acts the moving parts can continue in motion until the momentum thereof is overcome.

Also, suppose that a thread on one of the spools moving in a clockwise direction should break or become exhausted the spool-drop therein will co-operate in a similar way with the left hand shoe 40 and will release the friction clutch while permitting the parts to run until the momentum of the same is overcome.

After the broken thread is spliced, the mechanism can be again started in operation by the manipulating handle 30. Thus, the machine can be run at a high speed because of the peculiar wiping action between the spool-drops and the shoes of the stop mechanism.

The details and arrangements herein shown and described may be greatly varied by a skilled mechanic without departing from the scope of my invention as expressed in the claims.

Having thus described my invention what I claim and desire to secure by Letters Patent is:—

1. A stop mechanism for braiding machines comprising a driving clutch, means for locking the same in driving position, a releasing mechanism for said means comprising two interconnected shoes set in position so that the spool-drops can engage the same with a wiping action.

2. A stop mechanism for braiding machines comprising a driving clutch, means for locking the same in driving position, a releasing mechanism for said means comprising two interconnected pivoted shoes set in position so that the spool-drops can engage the same with a wiping action.

3. A stop mechanism for braiding machines comprising a driving clutch, means for locking the same in driving position comprising a pivoted lever having a hook, a pivoted catch for engaging the same, a spring for holding the catch in engagement with the hook, and a releasing mechanism comprising two interconnected pivoted shoes connected to said hook and set in position so that the spool-drops can engage the same with a wiping action.

In testimony whereof I have hereunto affixed my signature.

CHARLES H. OSLUND.